United States Patent

[11] 3,575,591

[72] Inventors Andre Edouard Joseph Chatelon Montrouge;
Calude Paul Henri Lerouge, Montgeron;
Jean Perrault, Port Marly, France
[21] Appl. No. 763,234
[22] Filed Sept. 27, 1968
[45] Patented Apr. 20, 1971
[73] Assignee International Standard Electric Corporation
New York, N.Y.
[32] Priority Oct. 16, 1967
[33] France
[31] 124561

[54] ADDITION CIRCUIT FOR THE DIGITAL CODES GENERATED IN ACCORDANCE WITH A NONLINEAR COMPRESSION LAW
10 Claims, 17 Drawing Figs.

[52] U.S. Cl. .......... 235/168, 333/14
[51] Int. Cl. .......... G06f 7/50
[50] Field of Search .......... 235/168, 152; 340/347; 179/15.55; 333/14; 235/168, 152; 340/347; 179/15.55; 333/14

[56] References Cited

UNITED STATES PATENTS

| | | | |
|---|---|---|---|
| 2,889,409 | 6/1959 | Carbrey | 340/347X |
| 3,180,939 | 4/1965 | Hall | 340/347X |
| 3,366,947 | 1/1968 | Kawashima et al. | 333/14X |
| 3,479,525 | 11/1969 | Harford | 333/14X |

*Primary Examiner*—Malcolm A. Morrison
*Assistant Examiner*—David H. Malzahn
*Attorneys*—C. Cornell Remsen, Jr., Walter J. Baum, Percy P. Lantzy, Philip M. Bolton, Isidore Togut and Charles L. Johnson, Jr.

ABSTRACT: There is disclosed an arrangement including a translator to derive two linear code signals from two compressed code signals and compressing the resultant sum of the two linear code signals in the translator after addition in an adder circuit. The translator comprises a shift register operating in two directions and a counter.

Inventors
ANDRÉ E. J. CHATELON
CLAUDE P. H. LEROUGE
JEAN PERRAULT
By Alfred C. Hill
Agent Inventors
ANDRE E. J. CHATELON
CLAUDE P. H. LEROUGE
JEAN PERRAULT
By Alfred C. Hill
Agent Inventors
ANDRÉ E. J. CHATELON
CLAUDE P. H. LEROUGE
JEAN PERRAULT
By Alfred C. Hill
Agent Inventors
ANDRÉ E. J. CHATELON
CLAUDE P. H. LEROUGE
By JEAN PERRAULT
Alfred C. Hill
Agent Inventors
ANDRÉ E. J. CHATELON
CLAUDE P. H. LEROUGE
JEAN PERRAULT
By Alfred C. Hill
Agent Inventors
ANDRÉ E. J. CHATELON
CLAUDE P. H. LEROUGE
JEAN PERRAULT
By Alfred C. Hill
Agent

ADDITION CIRCUIT FOR THE DIGITAL CODES GENERATED IN ACCORDANCE WITH A NONLINEAR COMPRESSION LAW

BACKGROUND OF THE INVENTION

This invention relates to pulse code modulation (PCM) systems and more particularly to a circuit for adding two digital code signals or numbers for employment in PCM systems.

Some switching systems enable the setting up of a conference between several subscribers. These systems are often called conference circuits. All the subscribers' sets which participate in a conference have generally the same possibilities, i.e., each subscriber can hear all the others, and all the others can hear him. In conventional telephony, a conference circuit comprises mainly multiple winding transformers through which the voice energy transmitted by one subscriber's set is equally distributed between all the other subscribers' sets. If $N$ is the number of subscribers' sets in the conference circuit, the minimum unavoidable attenuation is, in decibels, equal to 10 $\log_{10}(N-1)$.

There are conference circuits in which information is transmitted in time succession in the form of numbers or code signals expressed in binary code. In such conference circuits, which make use of the PCM system, each speech signal is sampled, and each sample is converted into a $n$-digit binary code. In the simplest case, where only three subscribers are in conference, the addition of the two speech codes or code signals produced by two different subscribers is carried out after the coding thereof to produce a third code which is transmitted to the third subscriber. In the set of this third subscriber, the code received is decoded and the resulting signal will contain the components related to the two codes, the mixing of which has been obtained by addition of the codes. It is clear that this addition is repeated for each group of two subscribers' codes and the sum code is transmitted to the third subscriber. Thus, all speech information is transmitted and switched in the form of binary codes.

A conference circuit in a PCM system may be divided into three independent parts: a first part comprising the coding and decoding circuits of the speech signals, a second part which carries out the addition of codes, and a third part which carries out switching of codes in order that each subscriber receives information which is intended for him. However, when the coding of the samples is not linear, it is not possible to carry out directly the addition of two codes. Several nonlinear coding laws exist. The nonlinear coding law selected depends upon the optimum characteristic which is desired. Thus, if it is required to obtain a constant signal to noise ratio in all the coding range, a logarithmic law of the form $y=1+a \log x$ is selected. However, in most cases, this logarithmic law is followed only in an approximate manner. In particular this law is approximated by straight line segments which subtend the arcs of the logarithmic curve. It is understood that the logarithmic law is more closely approximated by increasing the number of the straight line segments.

SUMMARY OF THE INVENTION

An object of the present invention is to provide an addition circuit for two digital code signals each generated by coding according to an approximate nonlinear compression law.

Another object of the present invention is to provide an addition circuit for two digital code signals each generated by coding according to an approximate logarithmic compression law.

Still another object of the present invention is to provide an addition circuit for two 7-digit speech codes obtained by coding according to an approximated logarithmic law having seven slopes which define 13 straight line segments, the ratio of the slopes of two consecutive segments being two to one.

A feature of this invention is the provision of an addition circuit for two digital code signals each having $n$ digits, where $n$ is an integer greater than one, and generated by coding according to an approximate nonlinear compression law comprising: input means for the two code signals; first means coupled to the input means to translate the two code signals into two linear code signals; second means coupled to the first means to add the two linear code signals together; and third means coupled to the second means to compress the sum of the two linear code signals according to the approximate nonlinear compression law.

Another feature of the present invention is the provision of an addition circuit for two 7-digit numbers obtained from the coding of signals according to an approximated logarithmic characteristic with 13 straight line segments symmetrical with respect to the origin, the slopes of two consecutive segments being in a two to one ration, comprising means for employing directly or complementing, as the case may be, the six least significant digits of the numbers, the most significant digit defining the polarity of the signal in such a way that the numbers correspond to the positive part of the characteristic; means which transform the two 6-digit binary numbers into two 10-digit binary numbers in such a way that a linear correspondence exists between these two 10-digit numbers and the amplitudes which they represent; means which, taking into account the sign of the numbers and their relative values, transform the numbers formed by the nine most significant digits of the linear numbers into numbers which may be directly employed by an adder circuit to add the two 9-digit numbers; means which compress the sum of the two 9 -digit numbers according to an approximate logarithmic law; and means which extract a 6-digit binary number resulting from the compression of the sum number and to join thereto the digit defining the sign of the sum number in relation with the sign of the numbers to be added.

Still another feature of the present invention is that the means which transforms the nonlinear codes into 10-digit linear codes and the means which compress the sum code are carried out by the same circuit which comprises mainly a shift register operating in both directions and a counter.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Before describing the invention, the logic algebra notations which will be used herein in order to simplify the description of the logic operations will be briefly discussed. The subject has been treated extensively in numerous papers and in particular in the book "Logical Design of Digital Computers" by M. Phister (J. Wiley—publisher).

Thus, if a condition characterized by the presence of a signal is written $A$, the condition characterized by the absence of said signal will be written $\overline{A}$.

These two conditions are linked by the well-known logical relation A $x$ $\overline{A}$=0, which the sign $x$ is the symbol of the coincidence logic function or AND function.

If a condition C appears only when conditions A and B are simultaneously present, the logical notation is written A $x$ B=C and this function may be carried out by means of a coincidence or AND gate.

If a condition C appears when at least one of two conditions E and F is present, the logical notation is written E+F=C and this function is carried out by means of a mixing or OR gate.

A function of two variables A and B may present four possible combinations and, if one combination is written as A $x$ B, the three other combinations are globally represented by the expression $\overline{A x B}$.

If condition A is characterized by digit 1 and condition $\overline{A}$ by digit 0, condition B by digit 1 and condition $\overline{B}$ by digit 0, the combination A $x$ B can be written 11, the combination $\overline{A}$ $x$ B can be written 01, etc.

Figure 9:
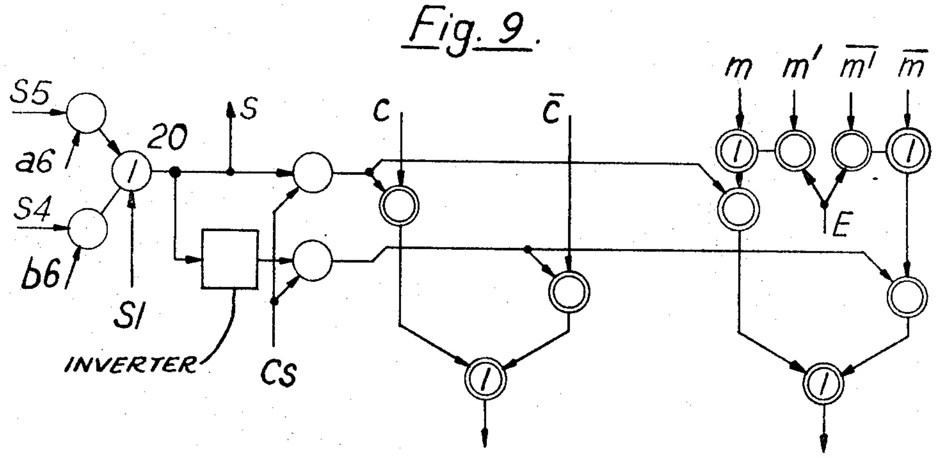
FIG. 9 illustrates a block diagram of the output logic circuit Ls of FIG. 6.
Figure 7:
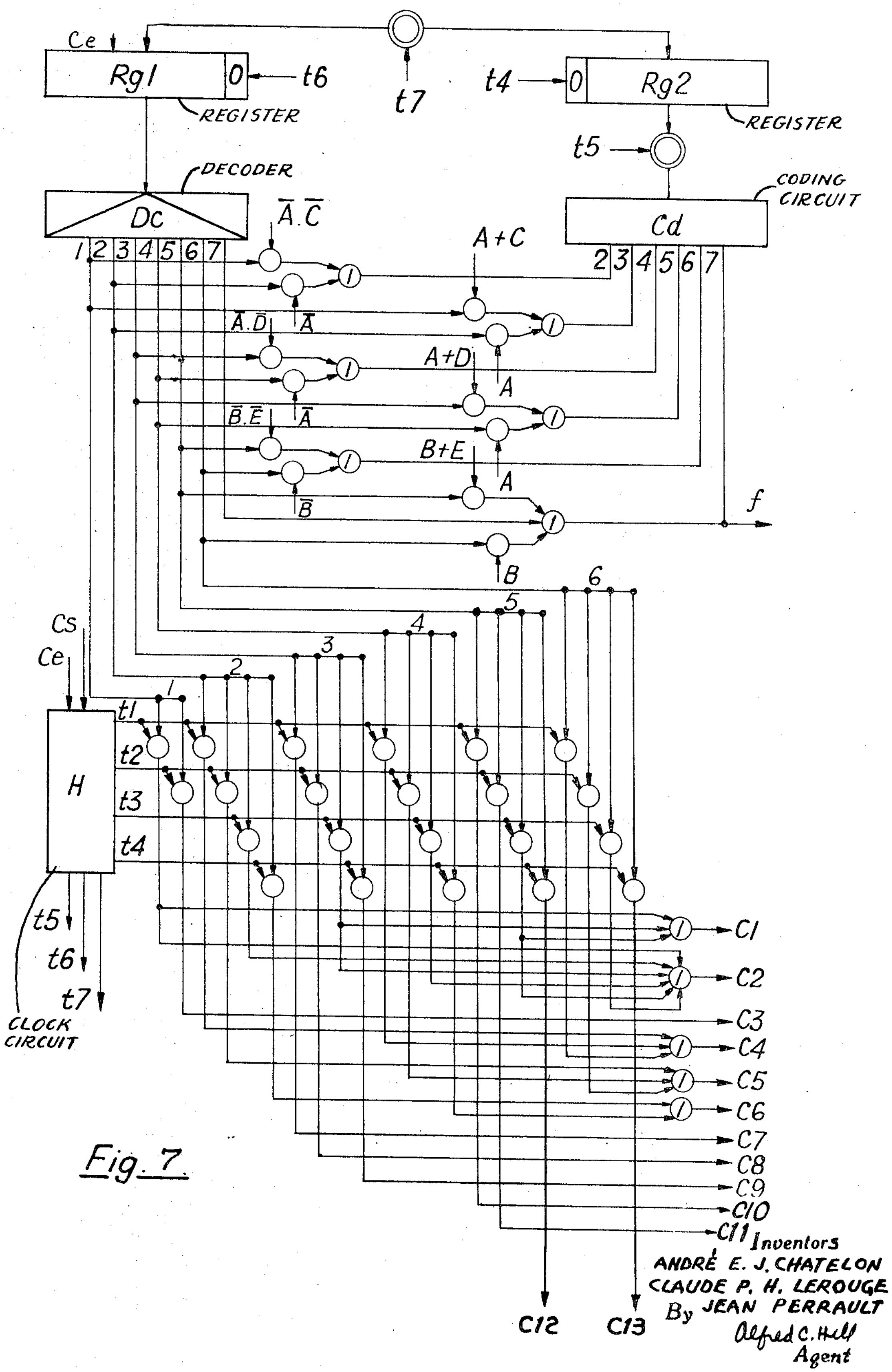
FIG. 7 illustrates a block diagram of the sequential timing control circuit S of FIG. 6 which generates the various control signals.
Figure 8:
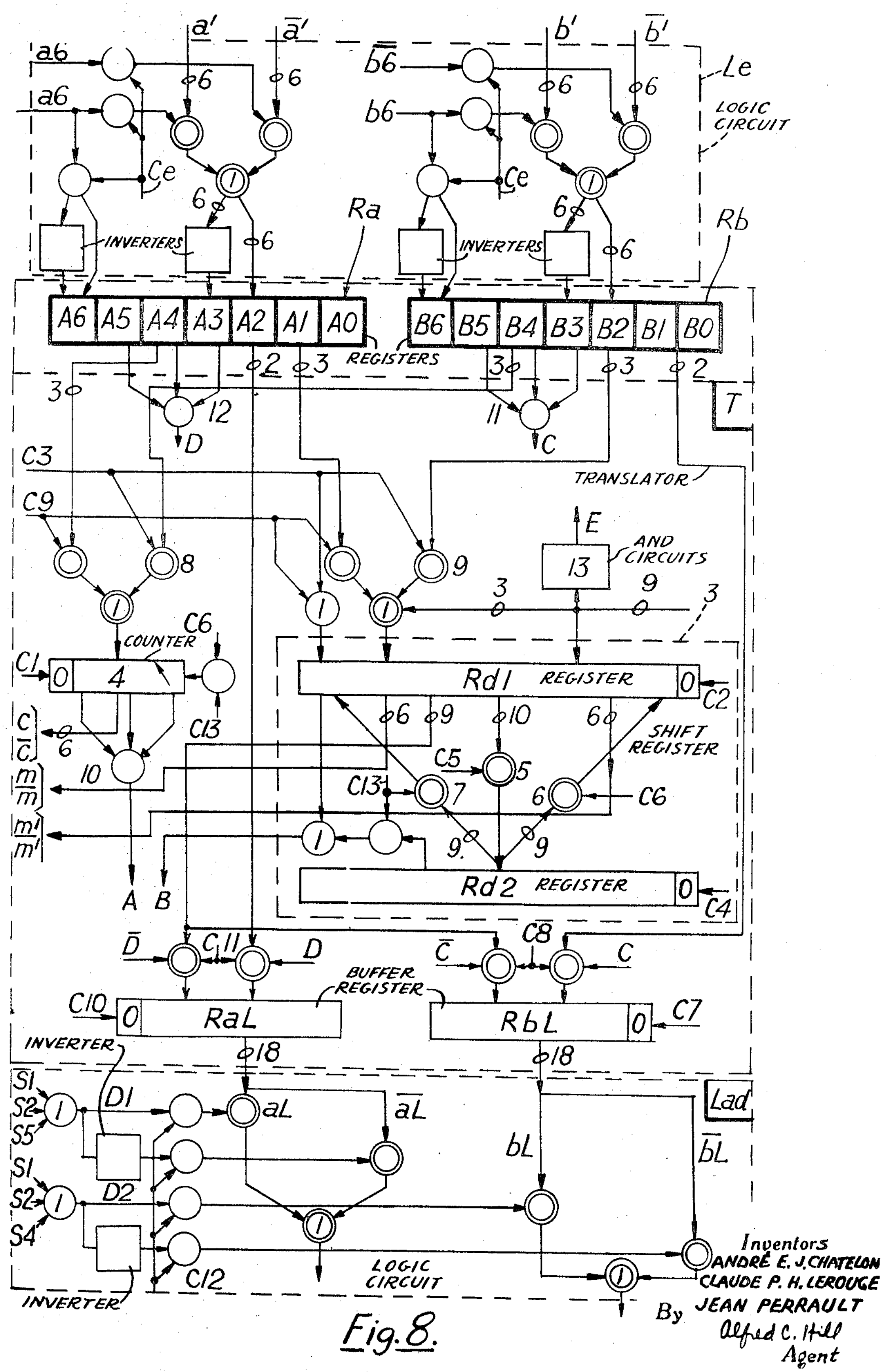
FIG. 8 illustrates the detailed block diagram of the rectangle in dashed line of FIG. 6.

A certain number of symbols which are used in FIGS. 7, 8 and 9 will now be defined with respect to FIGS. 1*a* to 1*i*.

Figures 1A, 1B, 1C, 1D, 1E, 1F, 1G, 1H, 1I:
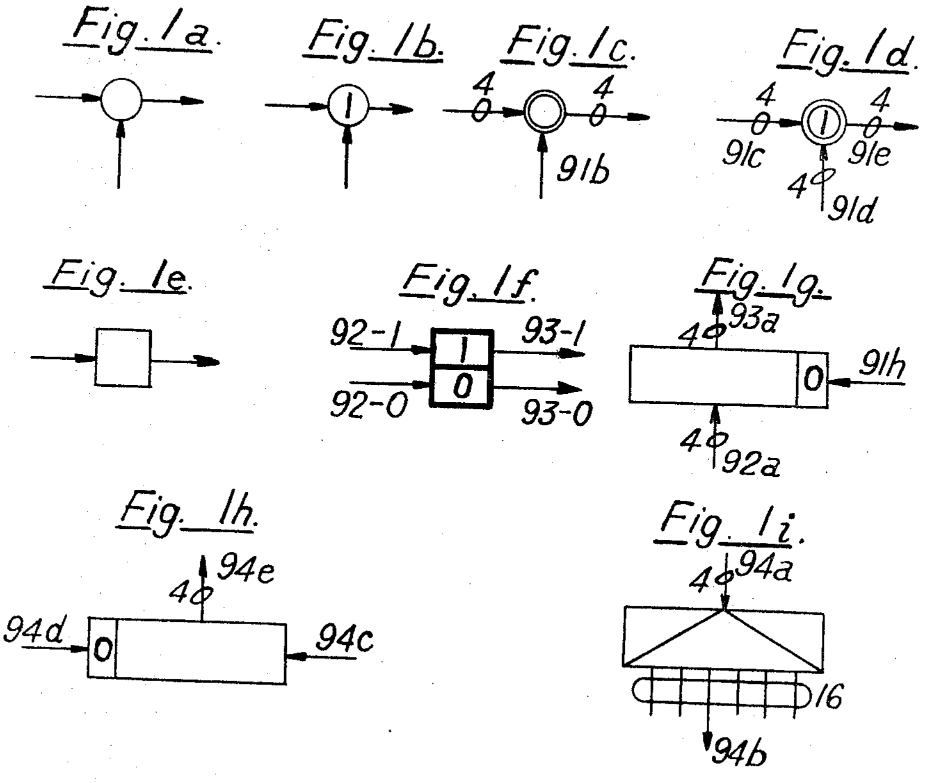
FIGS. 1*a* to 1*i* illustrate the various logic symbols used in various FIGS. of the drawing.

FIG. 1*a* represents a coincidence electronic gate, called an AND gate, which supplies a positive signal on its output terminal when its input terminals represented by arrows which touch the circle, receive simultaneously a positive signal. If A and B designate the signals which are present on each one of the two input terminals, this circuit performs the logical function A $x$ B.

FIG. 1*b* represents a mixing electronic gate, called an OR gate, which supplies a positive signal on its output terminal when a positive signal is applied on at least one of its input terminals represented by arrows which touch the circle. If C and D designate the signals which are present on each one of the two input terminals, this circuit performs the logical function C+D.

FIG. 1*c* represents a plurality of (four in the example illustrated) parallel AND gates controlled by the same signal supplied by conductor 91*b*. This circuit will be called hereinafter a multiple AND circuit. The circle and a number applied there, such as the number 4 shown, near a conductor indicates a group of four conductors.

FIG. 9*d* represents a multiple OR gate which comprises, in the case of the example, four OR gates with two input terminals 91*c* and 91*d* which provides on the four output conductors 91*e* the same signals are those applied over either of the input terminals.

FIG. 1*e* represents an inverter circuit. When a signal having the 0 volt or ground potential is applied to its input terminal this circuit supplies on its output terminal a positive signal. Further, this circuit supplies a 0-volt signal when the input terminal is at a positive potential. If E is the input signal, $\overline{E}$ will designate the output signal and it will be called the complement of E.

FIG. 1*f* represents a bistable circuit, or flip-flop, to which a control signal is applied over one of its input terminals 92–0 and 92–1 in order to reset it in the 0 state, or to set it in the 1 state. A voltage of same polarity as the control signals is present either on the output terminal 93–0 when the flip-flop is in the 0 state, or on the output terminal 93–1 when it is in the 1 state.

FIG. 1*g* represents a flip-flop register. In the example illustrated, it comprises four flip-flops, the 1 input terminals of which are connected to the conductors of the group 92*a* and the 1 output terminals of which are connected to the conductors of the group 93*a*. The digit 0 located at the end of the register means that the register is cleared when a signal is applied over the conductor 91*h*.

FIG. 1*h* represents a counter with four flip-flops which counts the pulses applied on its input terminal 94*c* and which is cleared by the application of a signal on its input terminal 94*d*. The 1 output terminals of the flip-flops are connected to the output conductors 94*e*.

FIG. 1*i* represents a decoder circuit which, in the case of the example illustrated, transforms a 4-digit binary code applied over the group of conductors 94*a* into a 1 out of 16 code, i.e., a signal appears on only one among the 16 conductors 94*b* for each one of the group codes applied to the input.

Figure 2:
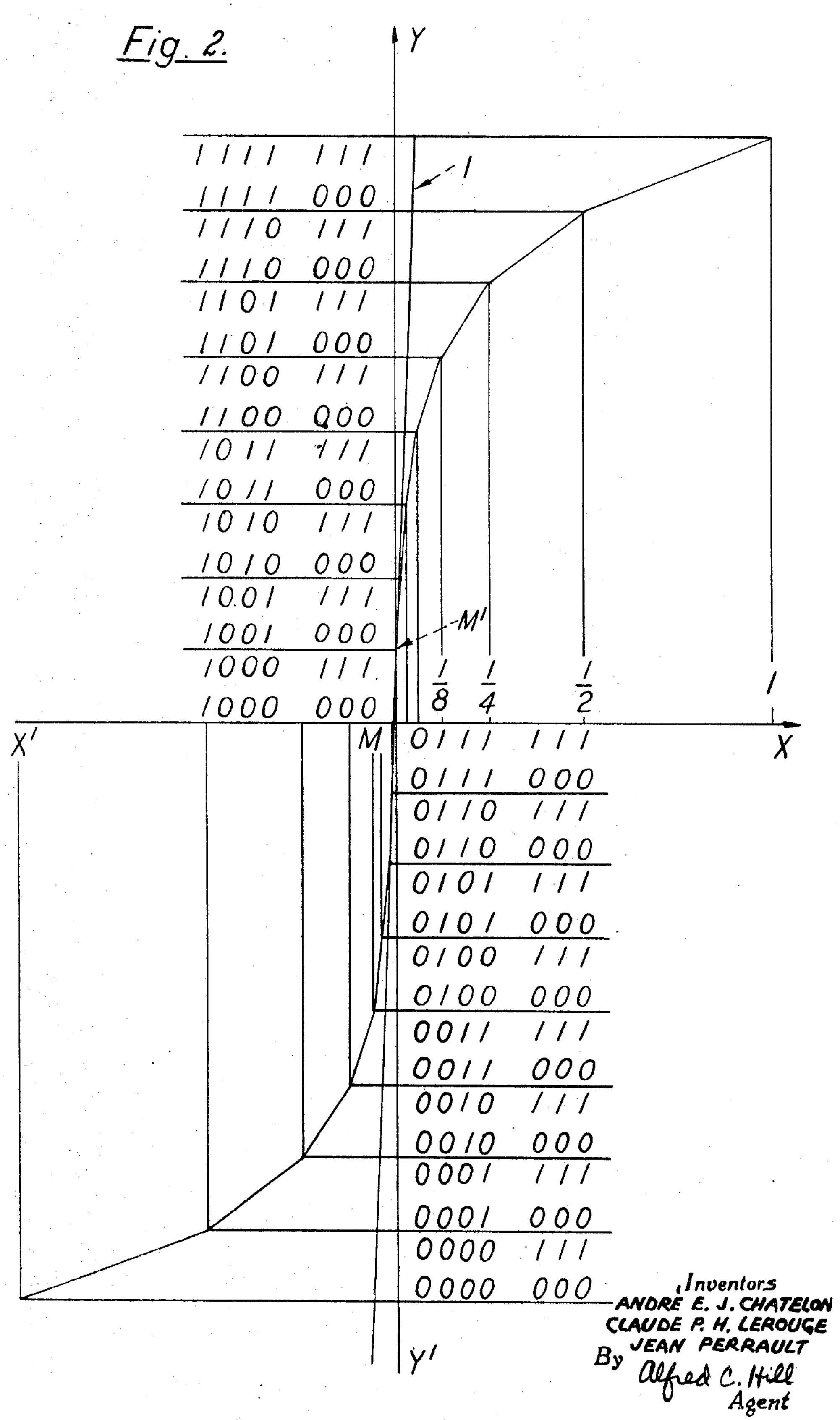
FIG. 2 shows the coding or compression characteristic with 13 straight lines.

For purposes of explaining the present invention the speech signals of the subscribers who participate in a conference are sampled and the amplitude of said samples is coded in a 7-digit binary code. The most significant digit of the code gives the polarity of the sample, and the six other digits define the amplitude of said sample. The correspondence between the amplitude of the sample and the code is not linear and follows an approximate logarithmic law which is represented by the curve of FIG. 2.

This coding curve, which is also called a compression curve, comprises, as an example 13 segments having seven different slopes. This multilinear law is obtained from the logarithmic law given by the formula $$y=1+\frac{\log_2 x}{8} \qquad (1)$$

in which $x$ is the ratio of the amplitude of the signal to be compressed to the maximum amplitude, and $y$ is the homologous ratio for the compressed signal. The ends of the segments are obtained by taking on the logarithmic curve the points with ordinates $$y=\frac{1}{8}, \frac{2}{8} \cdots \frac{7}{8}, 1$$

These eight points of the logarithmic curve and the origin M are linked together by eight straight line segments, the first two of which, near the origin M, are aligned. The part of the characteristic for the negative signals is obtained by symmetry with respect to the origin M. In the FIG. 2, the abscissa axis X'MX has been graduated in fractions of the maximum amplitude of the signal, and the ordinate axis Y'MY has been graduated in 7-digit codes. Only the 7-digit codes close to a change of the slope of the characteristic have been represented. It will be observed that each code corresponds to a certain interval of amplitudes of the signal which will be called quantizing step, the amplitude of said step varying according to the segments.

It will also be observed that the number $y$ obtained from the equation (1) ranges between zero and one. This number may be encoded into a binary number which, in the case of the example, is a 6-digit binary number, the number of digits determining the accuracy of the coding. In FIG. 2, that amounts to divide the axis MY into 64 equal levels, and to assign to each level a decimal number ranging between one and 64, this number being expressed in the form of a 6-digit binary number or code. This decimal number corresponds to the integer part of the number $y'$ given by the formula $$y'=2^6\left(1+\frac{\log_2 x}{8}\right) \qquad (2)$$

However, it is worth noting that the integer part of the number $y'$ is not necessarily equal to the number which would have been obtained with the multilinear characteristic.

It is clear that if the two binary codes obtained by the coding method defined by the curve of FIG. 2 are directly added, the resulting code does not correspond to the amplitude of the sum of the corresponding samples, except as far as the codes of the central segment are concerned.

It is therefore proposed, before an addition of two codes, to perform a linearization of said codes, then to perform a compression of the code resulting from the addition of the linear codes. If the curve of FIG. 2 is observed, it is noted that in the central part of the characteristic, the coding is linear and, thus, a linear characteristic is obtained by extending the segment of this central part. Thus, the straight line 1 of equation $y=2x$ is obtained. The number $y$ obtained from this equation varies between 0 and $2^4$ and, in the same way as previously, this number may be coded into a $n$-digit binary number. If it is required to keep, over the whole length of the straight line 1, the accuracy of the coding obtained over the central segment, the axis MY should be graduated in levels equal to those defined in this central segment, each one of these levels being defined by a number which corresponds to the integer part of the number Y2 given by the formula $Y2=2^{10}x$ (3). The number $n$ of binary digits of this linear code will thus be equal to 10.

Figure 3:
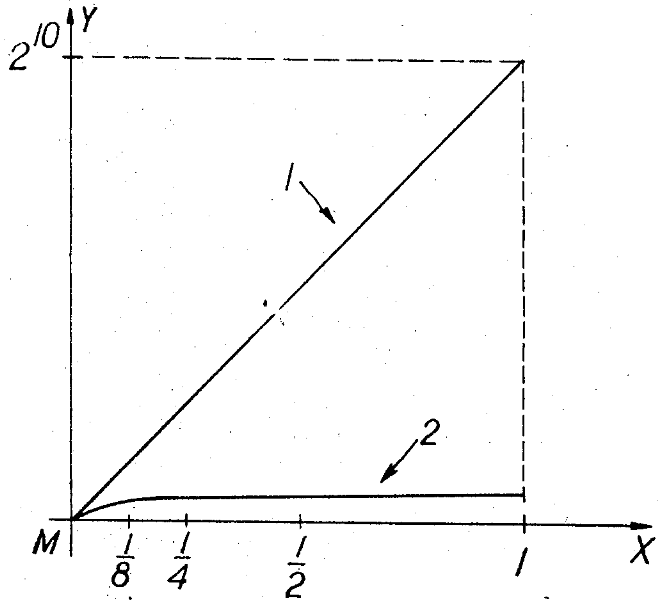
FIG. 3 shows the compression and linearization characteristics.

FIG. 3 represents, on a smaller scale, straight line 1 of FIG. 2, as well as logarithmic curve 2, these two curves having been reduced to the positive signals.

By combining the equations (2) and (3), there is obtained the equation $Y2=2^{2^{-3}y'+2}$ (4) which defines the exact correspondence between logarithmic curve 2 and straight line 1, i.e., the linearization. By taking $2^{13}y'=Y1$, equation (4) is written $Y2=2^{Y1+2}$ (5). The equation which defines the reverse correspondence, i.e., the compression, is written $Y1=\log_2(Y2)-2$ (6).

According to the equation (6) the operation of compression of a code Y2 consists essentially of producing the logarithm in the base two of this code. However, it will be observed that the formula (6) corresponds to a logarithmic compression curve without approximation, whereas the codes resulting from the coding according to the multilinear characteristic of FIG. 2 correspond to an approximated logarithmic law. Therefore, only the approximated logarithm in the base two of code Y2 will be produced, this approximation being such that it corresponds to the multilinear curve of FIG. 2. But, generally, it is demonstrated that any binary number N may be written $N=2^k aq1+x')$, in which $k$ is a positive integer the value of which is given by the number of digits between the leftmost digit 1 and the digit N, $x'$ is a binary fraction such that $0 \leqslant x' \leqslant 1$, which is constituted by all the digits of N, except the leftmost digit 1. Thus, $Y2=2^{k2}(1+x)$ and $\log_2(Y2)=k2+\log_2(1+x2)$. If only the first term of the limited development of $\log_2(1+^2)$ is retained, the approximated logarithm in the base two of Y2 will be equal to $k2+x2$. A circuit which carries out this operation comprises mainly a shift register in which the code Y2 is stored and a counter. Such a circuit is described for instance in the Review "IRE Transactions on Electronic Computers," Aug. 1962, pages 512 to 517, Volume EC 11. In the continuation of the description, $k2$ will be called the characteristic $c$, and $x2$ the mantissa $m$.

Figure 4:
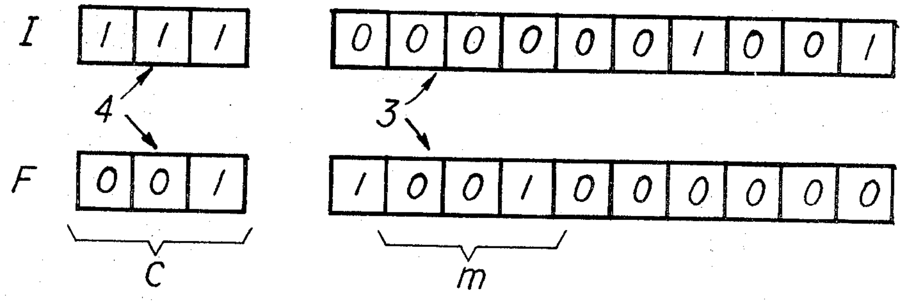
FIG. 4 shows the initial and final positions of the shift register and of the counter during the compression operation.

FIG. 4 shows the initial position I and final position F of shift register 3 and of counter 4 in the case of the compression of the code 0000001001. During the introduction of the linear code in register 3 comprising 10 flip-flops, counter 4 is set to the code 111. It will be observed that if only the approximated logarithm of Y2 was to be produced, counter 4 should have been set to the code 1001, corresponding to the digit 9 which is the maximum value of $k2$ for the 10-digit codes. However, in the equation (6) the digit 2 is subtracted from $\log_2$ (Y2), and this subtraction can then be carried out by shifting counter 4 to the position 9−2=7, viz, the code 111.

At each shift towards the left, the number of counter 4 decreases by one unit, and the shifting operations are stopped when the leftmost digit 1 of the code reaches the leftmost position of the register. In the course of the present description, the display of the digit 1 in the leftmost position of register 3 will correspond to condition B. The compressed code is the code constituted by the juxtaposition of the code $c$ of the counter (characteristic) and of the code $m$ of the register (mantissa), i.e., the code 001001.

By taking $2^{-3}y'=Y1$, there is obtained as a unit on the axis Y'MY (FIG. 2) the length of the projection of a segment of the multilinear curve on said axis. As far as the codes are concerned, that amounts to introducing a comma before the three rightmost digits. If it is assumed that the left-hand side of the comma, except the leftmost digit which is the polarity digit, is equal to $k1$, and that the right-hand side of the comma, i.e., the fractional part, is equal to $x1$, such that $\leqslant x1 \leqslant 1$, the right-hand side of equation (5) may then be expressed by $2^{k1+x1+2}$ (7). This expression (7) is not equal to the number Y2 which is desired, since there has been taken as a variable Y1 the codes obtained by the multilinear law, whereas equation (5) has been derived from the logarithmic law without approximation. The linear code Y2 will be obtained by observing that expression (7) corresponds to a number Y'2, the logarithm of which would be equal to $k1+x1+2$, this value corresponding then to the approximate logarithm of the number Y2 which will be written in the form of $Y2=2^{l1+Z}(1+x1)$. This formula shows that Y2 is the product of a number $(1+x1)$ by a number $2^{k1+2}$. It is well known in the technique of computers operating according to the binary system, that this multiplication may be performed by a shift register in which the number $(1+x1)$ is shifted by $(k1+2)$ times towards the left (the right-most positions of the registers being assigned to the least significant digits). The number of shifts is counted by a counter.

Figure 5:
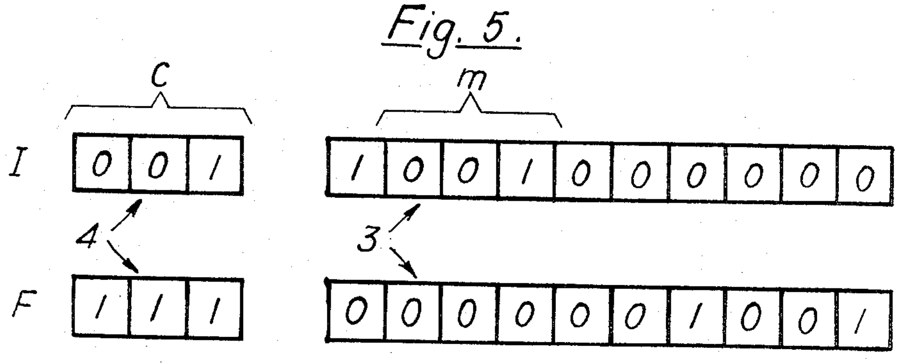
FIG. 5 shows the initial and final positions of the shift register and of the counter during the linearization operation.

FIG. 5 shows the initial I and final F positions of shift register 3 and of counter 4, in the case of the linearization of the code 001,001. The integer part of the code, i.e., the characteristic $c$, is introduced in the counter, whereas the code 1,001, corresponding to the number $(1+x1)$ is introduced in the leftmost positions of the register. If binary weights are assigned to the digits written in the register by giving the unit weight to the rightmost digit, this introduction of the number (1+xah) in this location of the register amounts to multiplying it by $2^9$ and the shifts are thus made towards the right. The number of shifts to be carried out towards the right is then equal to $9-(k1+2)=6$. At each shift, the content of the counter increases by one unit, and the shifts stop when the counter reaches the position seven and displays the code 111. The code written by the register is then the linear code. In the course of the present description, the fact that counter 4 displays the code 111 will correspond to condition A.

It has been determined that the linearization and compression operations may be carried out by a common circuit which will comprise mainly a shift register and a counter, this common circuit will be called hereinafter "translator." However, it will be observed that in the case of the compression, the contents of counter 4 must decrease by one unit at each shift, whereas it must increase by one unit at each shift in the case of linearization. But it is understood that, if it is considered that the binary numbers which appear respectively on the 1 and 0 outputs of a counter during counting operations, these numbers are, for instance, in the increasing order on the 1 outputs and are then in the decreasing order on the 0 outputs.

It will be observed that the linearization and compression operations cannot be applied to the codes of the segment MM' in FIG. 2, since the origin M is not on the logarithmic curve given by equation 1. For the codes 000000 up to 000111 of this segment MM', the linearization will consist in adding four digits 0 on the left of said codes. Such 6-digit codes are characterized by the fact that the three leftmost digits are zeros and this characteristic will correspond to condition C for one of the numbers to be added and to condition D for the other number. As far as the compression of the linear codes corresponding to this segment MM' is concerned, it is sufficient to take away the four leftmost digits 0. These 10-digit codes to which the compression operations are not applied will be detected by condition E obtained by means of the seven leftmost digits which must be zeros.

Figure 6:
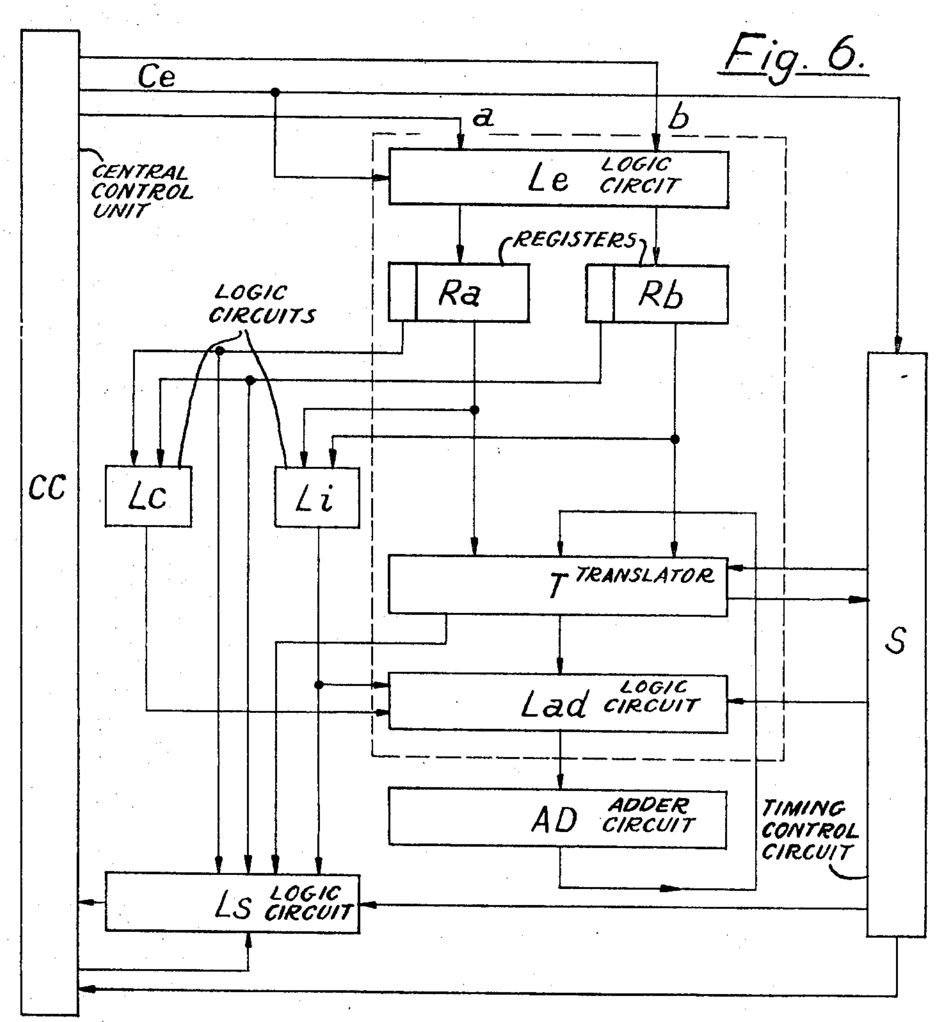
FIG. 6 illustrates a block diagram of the addition circuit in accordance with the principles of the present invention.

FIG. 6 gives the block diagram of an addition circuit of speech codes presenting features of the present invention. The two codes, or numbers, $a$ and $b$ to be added are supplied by central control unit CC, external to the addition circuit of the present invention. Unit CC supplies also signal $Ce$ which introduces the codes $a$ and $b$ in the registers $Ra$ and $Rb$, and which starts sequential timing control circuit S. The codes $a$ and $b$ are 7-digit codes, and their digits will be referenced $a0$ to $a6$ and $b0$ to $b6$, $a6$ and $b6$ being the most significant digits. The logic circuit $Le$ is provided for recording without alteration code $a$ when $a6=1$ and code $b$ when $b6=1$, and for recording the complement of the six least significant digits of code $a$ when $a6=0$ and the complement of the six least significant 1*of code 1*when $b6=0$, the most significant digit being recorded without complementation. By this complementation of the six least significant digits of the codes of the negative signals, there is obtained partial codes corresponding to positive signals since the codes of signals corresponding to equal amplitudes but of opposite signs are complementary codes (FIG. 2). This complementation is necessary since the translator T is provided only for codes of positive signals.

Digits *a*6 and *b*6 of the codes *a* and *b* are applied to a logic circuit L*c* which carries out a comparison of digits *a*6 and *b*6 and presents two outputs S1 and S2, such as S1=1 when the two signals are positive and S2=1 when the two signals are negative. S1 corresponds to the logical condition *a*6 *x* *b*6 and S2 to the logical condition $\overline{a6}$ *x* $\overline{b6}$. The circuit L*c* will not be described in detail in the present description.

The six least significant digits of the register R*a* which constitute the code *a''* and the six least significant digits of the register R*b* which constitute the code *b''* are applied to logic circuit L*i* which determines the code *a* or *b* corresponding to the highest absolute value. Circuit L*i* presents two outputs S4 and S5, such as S4=1 when the code *b* has the highest absolute value and S5=1 when the code as has the highest absolute value. Such a comparison circuit is described for instance in the Review "The Bell System Technical Journal," Sept. 1958, pages 1 180 to 1 185.

The signals S1, S2, S4 and S5 are used in combination, on one hand in logic circuit L*ad* in order to determine whether the two codes previously linearized, must be added or subtracted, and on the other hand in logic circuit L*s* in order to determine the sign of the code, previously compressed, resulting from the sum of the codes *a* and *b*.

The codes *a''* and *b''* are also applied separately to translator T which performs the linearization of said codes. When the two codes are linearized, they are available in the two registers, not shown in FIG. 6, from which they are transferred to adder circuit AD by means of logic circuit L*ad*. The code resulting from the addition is transferred to translator T where it is compressed. This compressed code is then transferred to central control unit CC through logic circuit L*s*.

The adder circuit AD carries out the addition of the two linear codes which are supplied to it by translator T through logic circuit L*ad*. It will be assumed that in this adder circuit each addition is carried out in a parallel form. Therefore, the adder circuit comprises an elementary adder circuit by digit of same weight of the codes to be added, including the digit of lowest weight, each elementary adder circuit being constituted by two "half-adders." On the whole, circuit AD comprises nine elementary adder circuits, which receive on one hand the digits of same weight of the codes, and on the other hand the carry of the elementary adder circuit associated with the digit of lower weight. Each elementary adder circuit presents two outputs, one for the carry and the other for the digit resulting from the addition. It will be observed that the carry output of the elementary adder circuit assigned to the most significant digit gives the value of the most significant digit of the sum.

The aim of logic circuit L*ad* is to present the two codes to be added in a form which can be directly employed by adder circuit AD. In effect, circuit AD is provided only for carrying out additions of positive numbers, whereas the numbers to be added may be positive and/or negative. When the numbers to be added are both positive or negative, said numbers are transmitted directly to the circuit AD, while when one of the numbers is positive and the other is negative, provision is made for complementing the smaller of the two in absolute value and to carry out a carry on the elementary adder circuit assigned to the least significant digit.

The linearization, compression and transfer operations are controlled by the signals generated by circuit S. Circuit S comprises, as shown on FIG. 7, a first register R*g*1 comprising three flip-flops, a decoder D*c* which decodes the code displayed by register R*g*1, a clock circuit H which supplies successive time signals *t*1 to *t*7, a coding circuit C*d*, a second register R*g*2 which displays the codes supplied by the coding circuit C*d*, a first multiplicity of electronic gates connected between the outputs of decoder D*c* and the inputs of coding circuit C*d*, said electronic gates being controlled by the signals A, B, C, D, and E supplied by circuit T and last a second multiplicity of electronic gates arranged on the outputs of the decoder D*c* and controlled by clock signals *t*1 to *t*4. The outputs of this second multiplicity of gates supply the signals C1 to C13 required for the setting up of the circuit of FIG. 6. The transfers of the code supplied by the coding circuit C*d* to the register R*g*2, then to the register R*g*1 are carried out respectively at the times *t*5 and *t*7. Besides, provision is made for a clearing the registers R*g*1 and R*g*2, respectively, at the times *t*6 and *t*4.

The detailed operation of the circuit will be now described in relation with FIGS. 7 and 8. In FIG. 8, which represents the circuits located in the rectangle in dashed lines of FIG. 6, logic circuit L*e*, registers R*a* and R*b*, translator T and logic circuit L*ad*, have also been represented by rectangles in dashed lines.

The codes *a* and *b* to be added are supplied to logic circuit L*e* in their direct form *a* and *b*, and their complemented form $\overline{a}$ and $\overline{b}$. In FIG. 8, each one of these four codes is divided into two partial codes, one with the most significant digit, the other with the least significant digits, these latter partial 6-digit codes having been referenced *a'*, $\overline{a'}$, *b'* and $\overline{b'}$. It is seen that if *a*6=1, the code *a'* and the digit *a*6 are transferred to the register R*a*. On the other hand, if *a*6=0, the code $\overline{a'}$ and the digit $\overline{a6}$ are transferred to the register R*a*. The same goes for the code *b*. The transfers are carried out under the control of the signal C*e* supplied by unit CC (FIG. 6). Since the registers R *a* and R*b* are not cleared, it is necessary to carry out a forced positioning. In registers R*a* and R*b*, flip-flops A0 to A6 and B0 to B6 bear the same reference number as the digit of the codes that have been represented. As it has been mentioned previously the codes displayed by the flip-flops which occupy the six rightmost positions of the registers R*a* and R*b* will be referenced *a''* and *b''*.

Translator T comprises mainly counter 4, shift register 3, buffer registers R*a*L and R*b*L, a multiplicity of electronic gates, the opening of which is controlled by the signals generated by circuit S (FIG. 6). Shift register 3 has been shown in a simplified form and comprises two registers R*d*1 and R*d*2 connected by a multiplicity of electronic gates the opening of which is controlled by signals C5, C6 and C13. A shift register comprising two registers is described for instance, at the page 16—21 of the book edited by Huskey and Korn and entitled "Computer Handbook" McGraw-Hill Book Company. The shift register which is described in the above-mentioned book comprises a series of AND circuits 5, an AND circuit per couple of flip-flops of same rank, which connect the 1 output of the flip-flops of the register R*d*1 to the 1 input of the flip-flop of same rank of register R*d*2, AND circuits 5 being controlled by the signal C5. It comprises also a second series of AND circuits 6 which link the 1 output of the flip-flops of register R*d*2 to the 1 input of the flip-flops of lower rank (towards the right) of register R*d*1, AND circuits 6 being controlled by the signal C6. It is then understood that the signal C5 enables a first direct transfer from register R*d*1 to register R*d*2 and that the signal C6 enables a second transfer, shifted by one rank towards the right, from register R*d*2 to register R*d*1, each transfer being preceded by a clearing of the corresponding registers by means of signals C2 and C4. Such a circuit enables only the shift towards the right, if a third series of AND circuits 7, controlled by signal C13, which link the 1 output of the flip-flops of register R*d*2 to the 1 input of the flip-flops of higher rank (towards the left) of register R*d*1, there is obtained shifts towards the left, said shifts being controlled by the signals C5, C13, C2 and C4.

Signal C*e* is also supplied to circuit S (FIG. 7) for deblocking clock circuit H and for storing the code 0 0 1 in register R*g*1. Therefore, the 1 output of the decoder D*c* is activated, and at the first clock signal *t*1, signals C1 and C2 appear and clear, respectively, counter 4 and register R*d*1. At the time *t*2, the signal C3 sets the leftmost flip-flop of register R*d*1 and opens the multiple AND circuits 8 and 9 which enable the transfer, on one hand of digits *b'*5, *b'*3 (or $\overline{b'5}$, $\overline{b'4}$, $\overline{b'3}$) from the register R*b* to counter 4, and on the other hand of digits $b'2$, $b'1$, $b'0$ (or $\overline{b'2}$, $\overline{b'1}$, $\overline{b'0}$) from register R$b$ to register R$d$1, these last three digits occupying the positions which follow immediately the leftmost position in which the digit 1 is written. If the partial code $b''$ is written 001,001, counter 4 and register R$d$1 display the initial configuration I of FIG. 5. AND circuit 10, the three inputs of which are connected to the three $\overline{1}$ outputs of counter 4, supplies the signal A=0 (or $\overline{A}$) AND circuit 11, the three inputs of which are connected to the 0 outputs of the flip-flops B3, B4 and B5, supplies also a signal C=0 (or $\overline{C}$). Therefore, due to these two signals, at the time $t5$, register R$g$2, previously cleared at the time $t4$, displays the code 010. This code is transferred afterwards, at the time $t7$, to register R$g$1, previously cleared at the time $t6$.

The output 2 of decoder D$c$ is activated so that the signals C4, C5, C2, C6 appear, respectively, at the times $t1$, $t2$, $t3$, and $t4$ and enable, on one hand, to shift by one step towards the right the code of register R$d$1, and on the other hand, the advance by one step of counter 4 which displays then the code 010. This phase two, because it corresponds to the 2 output of decoder D$c$ (FIG. 7), is repeated until the appearance of condition A which shifts circuit S to phase three (3 output of decoder D$c$). This condition A means that the code displayed by register R$d$1 is linear. During this phase three, circuit S generates successively signals C7, C8, C1, C2 and C9 which carry out the writing of the linear code $b$L, corresponding to the nonlinear code $b''$, in the register R$b$L, and the writing of the nonlinear code *$a''$ in counter 4 and register Rd1*. When one or several shifts are required, (A=0 and D=0), circuit S shifts to phase four (4 output of decoder D$c$) during which it generates successively signals C4, C5, C2 and C6, and this phase four is repeated until the appearance of signal A. Circuit S shifts then to phase five (5 output of decoder D$c$) during which it generates successively signals C10 for clearing of register R$a$L, C11 for transfer of linear code $a$L, corresponding to the nonlinear code $a''$, from register R$d$1 to register R$a$L, C2 for clearing register R$d$1, and C12 for transfer of the two linear codes $a$L and $b$L from the registers R$a$L and R$b$L to adder circuit AD (FIG. 6) through logic circuit L$ad$. The writing in registers R$a$L and R$b$L is carried out in such a way that the codes $a$L and $b$L are divided by two. This systematic division by two is necessary in order that the sum of the codes may be, at the maximum, a 10-digit number. This division is obtained by transmitting only the nine most significant digits of the codes and, therefore, registers R$a$L and R$b$L will each comprise none flip-flops.

In the case where the code $b''$ is a code of the segment MM' of FIG. 2, signal C=1 shifts from phase one to phase three during which digits $b$1 and $b$2 of register R$b$ are transferred to the rightmost positions of register R$b$L. In the case where the code $a''$ is the code of the segment MM', signal D=1 shifts from phase three to phase five during which the digits $a$1 and $a$2 of register R$a$ are transferred to register R$a$L.

As it has been mentioned previously, in relation with FIG. 6, logic circuit L$ad$ is provided for transmitting to adder circuit AD (FIG. 6) numbers which can be directly employed by this latter circuit in such a way that the result of the addition is the absolute value of the algebraic sum of the two numbers, and that this absolute value corresponds to a code of the positive part of the compression characteristic (FIG. 2). Thus, when the two numbers to be added are both positive or both negative, (S1=1 or S2=1) the numbers $a$L and $b$L are directly transmitted to adder circuit AD. When the numbers are of opposite sign (S1=0 and S2=0) and $a''$ is bigger than $b''$ (S5=1, S4=0, the number $a$L is directly transmitted while the complement of the number $b$L is transmitted. When the numbers are also of opposite signs (S1=0 and S2= 0) and $a''$ is smaller than $b''$ (S4=1, S5=0) the numbers $\overline{aL}$ and $b$L are transmitted.

The subtraction of two numbers obtained by an addition of the bigger number and of the complement of the smaller number is a well-known method in the technique of the electronic computers operating in binary system, however, provision must be made for the addition of the digit 1 to the least significant digit. In adder circuit AD, it is foreseen that the carry input of the elementary adder of the lowest rank receives the signals $\overline{D1}$ and $\overline{D2}$ through an OR circuit, these two signals having the value 1 when the numbers are of opposite signs. These signals $\overline{D1}$ and $\overline{D2}$ are the complements of the signals D1=S1+S2+S5 and D2=S1+S2+S4 (circuit L$ad$—FIG. 8).

The numbers displayed in registers R$a$L and R$b$L are transmitted to adder circuit AD (FIG. 6) when signal C12 appears at the time $t4$ of phase five. Previously, at the time $t3$, counter 4 and register R$d$1 have been cleared, respectively, by signals C1 and C2. The result of the addition is then transferred in register R$d$1 in such a way that the digits of the sum occupy the rightmost positions.

When the digit displayed by the leftmost flip-flop of the register R$d$1 is a 1, signal B appears and there is a shift to phase seven (7 output of decoder D$c$) (FIG. 7) which is a final phase relooping on itself and during which no control signal is generated. Also, there is a shift directly from phase five to phase seven when signal E=1 appears, said signal meaning that the sum number corresponds to a compressed number of the segment MM' of FIG. 2. This signal E is supplied by circuit 13 constituted by an AND circuit the inputs of which are connected to the 0 outputs of the seven leftmost flip-flops of register R$d$1. The compressed number is obtained by taking, on one hand, the 0 outputs of counter 4, and on the other hand, the 1 outputs of the three positions on the right-hand side of the leftmost position of register R$d$1.

When the digit displayed by the leftmost flip-flop of the register R$d$1 is a 0, signal B does not appear, and there is a shift to phase six (6 output of decoder D$c$). The signals C4, C5, C2 and C13 are supplied by circuit S and enable the shift by one step towards the left of the sum number. This phase six is repeated until the appearance of signal B at the time $t4$. This signal B means, as it has been seen previously, that it is no longer necessary to carry out any shift.

The code contained in counter 4 and register R$d$1 corresponds to the compressed code of a positive signal since the linearization and compression operations have been carried out on codes corresponding to positive signals. But it is clear that the result of the addition may be positive or negative according to the polarity of the input signals and their amplitude. In order to obtain the exact compressed code, it is necessary to extract the code contained in counter 4 and register R$d$1 through logic circuit L$s$ shown in FIG. 9. Thus, when the two signals are positive (S1=1), the compressed code is directly transmitted. This direct transmission takes place also when the two signals are of opposite signs and the positive signal has the highest absolute value, i.e., when S5=1, $a$6=1, on one hand, and S4=1, $b$6=1 on the other hand. When none of the three previous conditions is fulfilled the complement of the compressed code is transmitted. The sign digits of the compressed code is given by the output signal of OR circuit 20, FIG. 9. The transfer is controlled by signal C$s$ supplied by unit CC which has received signal $f$ (FIG. 7) of the final phase seven. This signal C$s$ is also used for stopping the clock H, FIG. 7.

In the case where there is available signal E=1, the mantissa is constituted by the three rightmost digits of register R$d$1, and these digits are transmitted to the circuit L$s$ where they are transferred towards unit CC only if E=1 (signals $m'$ and $\overline{m'}$, FIG. 9).

The various circuits have been described by assuming that the 7-digit codes were assigned to the different levels in such a way that the code 0000000 corresponds to the maximum negative amplitude and that the code 1111111 corresponds to the maximum positive amplitude (FIG. 2). However, the circuit of the present invention also applies to the codes resulting from the coding according to the characteristic of FIG. 2, but with a distribution of the codes such that the codes 1000000 and 0000000 correspond to levels on both sides of the zero level, that the code 1111111 corresponds, for instance, to the maximum negative amplitude, and that the code 0111111 corresponds to the maximum negative amplitude. With such codes to be added, logic circuit Le FIGS. 6 and 8) is no longer necessary.

While we have described the above principles of out invention in connection with specific apparatus, it is to be clearly understood that this description is made only by way of example and not as a limitation of the scope of our invention as set forth in the objects thereof and in the accompanying claims.

We claim:

1. An addition circuit for two digital code signals each having $n$ digits, where $n$ is an integer greater than one, and generated by coding according to an approximate nonlinear compression law comprising:

input means for said two code signals;

first means coupled to said input means to translate said two code signals into two linear code signals;

second means coupled to said first means to add said two linear code signals together; and third means coupled to said second means to compress the sum of said two linear code signals according to said approximate nonlinear compression law.

2. A circuit according to claim 1, wherein said input means includes logic circuit means responsive to said two code signals, first register means coupled to said logic circuit means for storing ($n$—1) digits of one of said two code signals or its complement, and second register means coupled to said logic circuit means for storing ($n$—1) digits of the other of said two code signals or its complement.

3. A circuit according to claim 1, wherein said first means is further coupled to the output of said second means and performs the functions of said third means.

4. A circuit according to claim 3, wherein said first means includes shift register means coupled to said input means operating in two directions, and counter means coupled to said input means.

5. A circuit according to claim 1, wherein said input means includes logic circuit means responsive to said two code signals, first register means coupled to said logic circuit means for storing ($n$31 1) digits of one of said two code signals or its complement, and second register means coupled to said logic circuit means for storing ($n$—1) digits of the other of said two code signals or its complement; and said first means is further coupled to the output of said second means and performs the function of said third means;

said first means including shift register means coupled to said first and second register means operating in two directions, and counter means coupled to said first and second register means.

6. A circuit according to claim 1, wherein said approximate nonlinear compression law is an approximate logarithmic compression law.

7. A circuit according to claim 6, wherein said input means includes logic circuit means responsive to said two code signals, first register means coupled to said logic circuit means for storing ($n$—1) digits of one of said two code signals or its complement, and second register means coupled to said logic circuit means for storing ($n$—1) digits of the other of said two code signals or its complement.

8. A circuit according to claim 6, wherein said first means is further coupled to the output of said second means and performs the functions of said third means.

9. A circuit according to claim 8, wherein said first means includes shift register means coupled to said input means operating in two directions, and counter means coupled to said input means.

10. A circuit according to claim 6, wherein said input means includes logic circuit means responsive to said two code signals, first register means coupled to said logic circuit means for storing ($n$—1) digits of one of said two code signals or its complement, and second register means coupled to said logic circuit means for storing ($n$—1) digits of the other of said two code signals or its complement; and said first means is further coupled to the output of said second means and performs the function of said third means;

said first means including shift register means coupled to said first and second register means operating in two directions, and counter means coupled to said first and second register means.